March 9, 1937. H. A. CURTIS 2,072,980
MANUFACTURE OF GRANULAR CALCIUM PHOSPHATES
Filed June 4, 1934
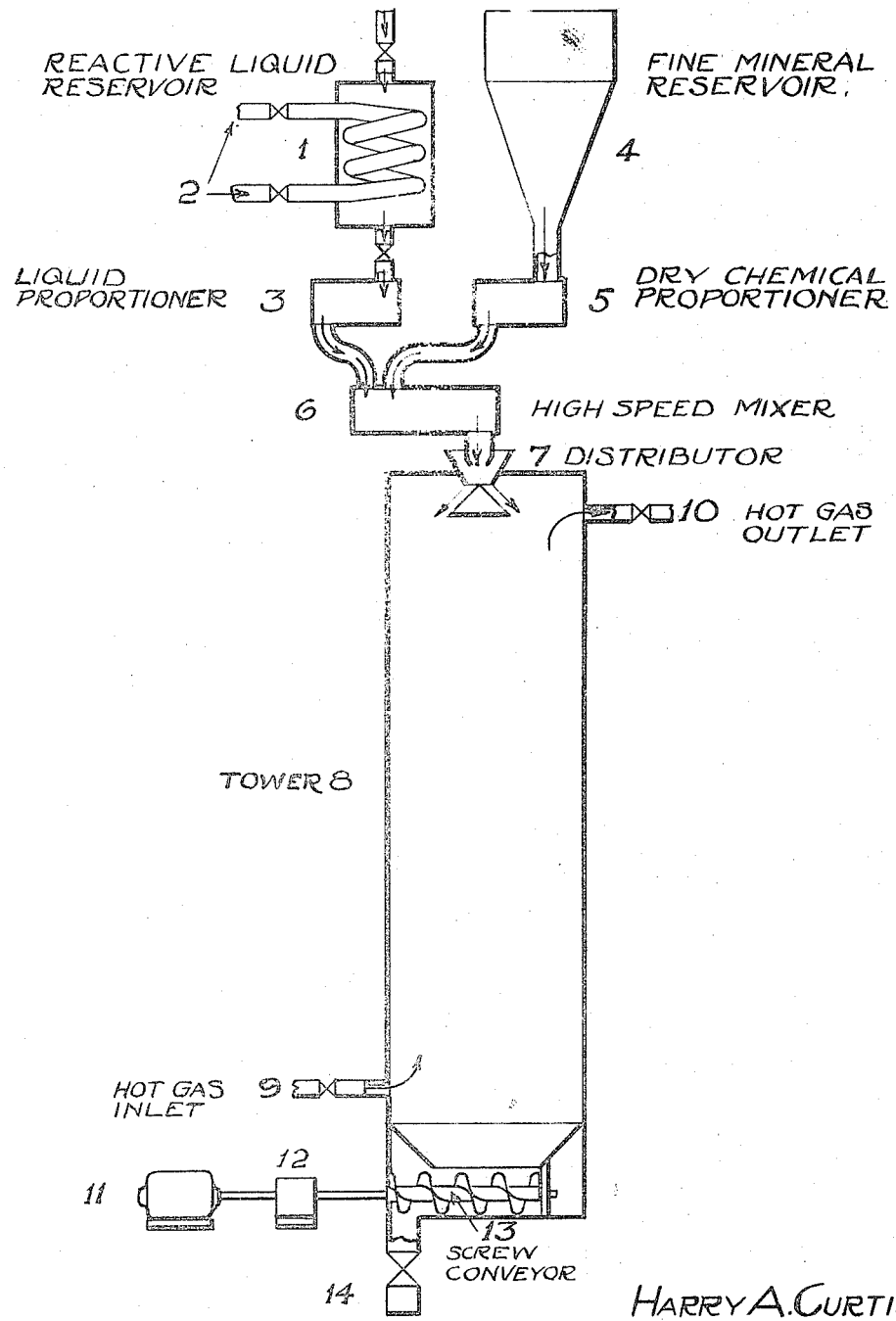
Harry A. Curtis
INVENTOR
BY Arthur L. Davis
ATTORNEY

UNITED STATES PATENT OFFICE 2,072,980

MANUFACTURE OF GRANULAR CALCIUM PHOSPHATES

Harry A. Curtis, Knoxville, Tenn., assignor to Tennessee Valley Authority, Wilson Dam, Ala., a corporation of the United States Application June 4, 1934, Serial No. 728,917

5 Claims. (Cl. 23—109)

(Granted under the act of March 3, 1883, as amended April 30, 1928; 370 O. G. 757)

This application is made under the act of April 30, 1928, and the invention herein described, if patented, may be manufactured and used by or for the Government for governmental purposes without the payment to me of any royalty thereon.

This invention relates to the process of an apparatus for the manufacture of products obtained from the reaction of finely divided solid chemical materials with mineral acids; and particularly the manufacture of mono-calcium phosphate from limestone or phosphate rock and phosphoric acid.

One of the objects of my invention is the provision for a continuous process for the reaction of fine chemical materials with mineral acids, which may result in a substantially complete combination to form a fine, dry product. Another object of this invention is the manufacture of concentrated fertilizers or concentrated fertilizer ingredients in such a physical condition that a more uniform distribution in the soil may be obtained.

Calcium phosphates, known commercially as superphosphates, prepared by the action of phosphoric acid on limestone, or by the action of sulfuric acid or phosphoric acid on mineral phosphates, emerge from the reaction in the respective processes as hard, discrete masses which require grinding to reduce them to suitable size for mixing with other fertilizer ingredients or for direct distribution to the soil. In any event, the particles reduced to a suitable size have irregular shapes which tend to interfere with the uniform flow of small streams of the material during application.

I have found that, by controlling the conditions of reaction for fine solid chemical materials, reactive with phosphoric acid, and phosphoric acid, the initial mixture of partially reacted material may be distributed into a tall vertical tower in such a manner as to form substantially spherical particles which will fall countercurrent to a heated stream of ascending gas and reach the bottom of the tower as hard, discrete spheres not to exceed a predetermined size.

Some of the reactions involved in the manufacture of calcium phosphates by steps within the scope of this invention are presented: using limestone and phosphoric acid in such proportions as to form mono-calcium phosphate $$CaCO_3 + 2H_3PO_4 = CaH_4(PO_4)_2 \cdot H_2O + CO_2$$

using phosphate rock with phosphoric acid and sulfuric acid to form mono-calcium phosphate

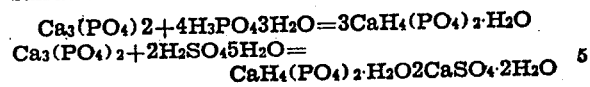

using phosphate rock and phosphoric acid to form di-calcium phosphate

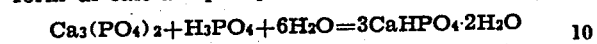

Magnesian limestone, which is dolomitic limestone with 5 to 18% magnesium carbonate, and dolomite react with phosphoric acid in like manner to form mixed calcium magnesium phosphates.

A diagrammatic vertical section of one form of apparatus for the embodiment of my process is shown in the accompanying drawing. The reactive liquid reservoir 1, fitted with the heating element 2, supplies the charge to the liquid proportioner 3, and the fine mineral reservoir 4, supplies the charge to the dry chemical proportioner 5; the reactive liquid and the fine mineral pass from the liquid proportioner 3, and the dry chemical proportioner 5, respectively, into the high speed mixer 6, which delivers the partially reacted fluid mixture to the distributor 7, placed in the tower 8; the dispersed masses from the distributor 7, fall countercurrent to the stream of hot gas admitted near the bottom of the tower through valved line 9, and withdrawn from near the top of the tower through valved line 10; the motor 11, through the speed reducer 12, drives the screw conveyor 13, located in the bottom of the tower 8, and discharges the accumulated product, which has fallen to the bottom of the tower, through the valved outlet 14.

One example of the operation of my process is given for the manufacture of mono-calcium phosphate from phosphate rock and phosphoric acid: 100 mesh phosphate rock containing 35 to 36 percent of $P_2O_5$ may be fed at the rate of 200 pounds per hour along with 65 percent phosphoric acid, which has been heated to 125° C., at the rate of 200 pounds of $H_3PO_4$ per hour into a high speed mixer. This partially reacted mixture, while still fluid, is rapidly discharged through a distributor in such a manner that the fluid particles may assume a substantially spherical shape and of such size that the bulk of the finished particles pass through a four mesh screen. The time for the discharge of the partially reacted mixture from the mixer into the tower is in the order of 1 to 2 seconds. The spherical particles fall through the tower counter-current to a rising column of air heated to 250 to 300° C. reaching the bottom of the tower in the form of dry, hard, substantially spherical granules.

It is evident that there are numerous factors which will influence the conditions for the most satisfactory operation of my process, the actual limits of which cannot be established except by a detailed study of each set of raw materials and finished products involved. In the case of the manufacture of the calcium phosphates from either limestone or phosphate rock and phosphoric acid, there are preferred limits which will be set forth. The phosphoric acid may be heated to the temperature necessary to cause the proper rate of reaction for the proportions and concentration of acid used for the preparation of the fluid partially reacted mixture, which in most instances will not exceed 150° C. However, either one or both of the reactants may be heated to produce the same effect. The solid reactant may be heated by means especially provided for the purpose or may be obtained in that condition as a preliminary treatment step such as a roasting process. In some instances, such as in the manufacture of di-calcium phosphate, it is necessary to dilute the phosphoric acid somewhat in order that there will be sufficient volume of liquid charged to produce the requisite initial fluidity. The fluid partially-reacted mixture may be sprayed into the tower by any well known means for distributing and otherwise dispersing fluid media of this character so that the formation of substantially spherical particles may be effected. The relative positions of the mixer and distributor should be maintained the shortest possible distance apart, since the speed of the reaction at the higher temperature is so rapid that it takes only relatively a few seconds after intimate contact of the mineral and acid for the fluid mixture to congeal. The distribution may take place either at the top of the tower or at some lower point in the tower. In the latter event, the space above the point of distribution will serve as a means for separation of the finely divided particles which may be carried by the hot gas which has been in contact with the particles in the tower. The hot gases used in the tower may be air, heated by direct or indirect firing, or other suitable gas with an inlet temperature of at least 200° C. In certain instances, the design of the tower and the rate of flow of the hot gases will require an additional tower or other means of separation of the small particles of product carried out of the tower by the hot gases. Substantially stoichiometric proportions of the chemically active constituents of both the solid and liquid reactants are used in all cases. I do not wish to limit myself by these values which are presented to show what is considered desirable operating values.

Certain terms used throughout the description and claims are understood to have the following meaning: solid chemical materials refer to crude materials, such as minerals, and materials of high as well as intermediate states of purity; concentrated acid refers to strong, but not necessarily anhydrous material with the concentrations being 65% or more; and hot gases refer to a single heated gas or heated mixture of gases with heat derived from any convenient source or by any suitable means, but with such heated gases having no substantial chemical reactivity as far as the material with which it comes in contact is concerned. The term "fluid, partially reacted mixture" means a composition resulting from the high speed very intimate mixing of the charge only so long as this composition retains a physical state of high fluidity in counter distinction to its subsequent plastic stage of relatively low fluidity. The period of time from the initial mixing to the end of the period of high fluidity varies from 10 to 45 seconds, depending upon the combination of conditions in effect. The total length of time for the high speed mixing is only an increment of the total period of high fluidity of such mixtures. The total time for the combined mixing in the high speed mixer and the discharge or dispersion into the tower is substantially less than the period of high fluidity of such mixtures since it is imperative that mixtures of high fluidity rather than substantially plastic materials be so distributed or dispersed.

It will be seen, therefore, that this invention actually may be carried out by the modification of certain details without departing from its spirit or scope.

I claim:

1. Process of treating limestone with concentrated phosphoric acid, containing at least 65% by weight of $H_3PO_4$, to form a granular calcium phosphate which is essentially mono-calcium phosphate, which comprises, contacting the fine limestone and the phosphoric acid in a high speed paddle type mixer, with control of the size of the limestone, the concentration and the temperature of the acid, and the time of contact, to produce a fluid, partially reacted mixture which will set in a few seconds after dispersion; dispersing the fluid, partially reacted mixture through a fluid distributor into a tower; and contacting the dispersed particles countercurrently with a heated gas to produce a solid, substantially, completely reacted product.

2. Process of treating phosphate rock with concentrated phosphoric acid, containing at least 65% by weight of $H_3PO_4$, to form a granular calcium phosphate which is essentially non-calcium phosphate, which comprises, contacting the fine phosphate rock and the phosphoric acid in a high speed paddle type mixer, with control of the size of the phosphate rock, the concentration and the temperature of the acid, and the time of contact, to produce a fluid, partially reacted mixture which will set in a few seconds after dispersion; dispersing the fluid, partially reacted mixture through a fluid distributor into a tower; and contacting the dispersed particles countercurrently with a heated gas to produce a solid, substantially, completely reacted product.

3. Process of treating a calcium compound, reactive with concentrated phosphoric acid to produce mono-calcium phosphate, with the concentrated phosphoric acid, to form a granular calcium phosphate which is essentially non-calcium phosphate, which comprises, contacting the fine calcium compound and the phosphoric acid in a high speed paddle type mixer, with control of the size of the calcium compound, the concentration and the temperature of the acid, and the time of contact, to produce a fluid, partially reacted mixture which will set in a few seconds after dispersion; dispersing the fluid, partially reacted mixture through a fluid distributor into a tower and contacting the dispersed particles countercurrently with a heated gas to produce a solid substantially, completely reacted product.

4. Process of treating a calcium compound, reactive with a concentrated mineral acid to produce mono-calcium phosphate, with concentrated mineral acid, to form a granular calcium phosphate, which comprises, contacting the fine calcium compound and the mineral acid in a high speed paddle type mixer, with control of the size of the calcium compound, the concentration and the temperature of the acid, and the time of contact, to produce a fluid, partially reacted mixture which will set in a few seconds after dispersion; dispersing the fluid, partially reacted mixture, through a fluid distributor into a tower; and contacting the dispersed particles countercurrently with a heated gas to produce a solid, substantially, completely reacted product.

5. Steps in the process of treating calcium compound, reactive with a concentrated mineral acid to produce mono-calcium phosphate, with the concentrated mineral acid, to form the granular phosphate which comprises, dispersing the fluid, partially reacted intimate mixture of the fine calcium compound and the mineral acid which will set in a few seconds after dispersion, through a fluid distributor into a tower; and contacting the dispersed particles countercurrently with a heated gas to produce a solid, substantially, completely reacted product.

HARRY A. CURTIS.

Certificate of Correction

Patent No. 2,072,980. March 9, 1937.

HARRY A. CURTIS

It is hereby certified that errors appear in the printed specification of the above numbered patent requiring correction as follows: Page 1, second column, lines 3 to 5, strike out the equations and insert instead $$Ca_3(PO_4)_2 + 4H_3PO_4 \cdot 3H_2O = 3CaH_4(PO_4)_2 \cdot H_2O$$

$$Ca_3(PO_4)_2 + 2H_2SO_4 \cdot 5H_2O = CaH_4(PO_4)_2 \cdot H_2O + 2CaSO_4 \cdot 2H_2O$$

Page 2, second column, lines 42 and 59, claims 2 and 3, respectively, for the compound word "non-calcium" read *monocalcium*, and page 3, first column, line 13, claim 5, insert the article *a* before the word "calcium"; and that the said Letters Patent should be read with these corrections therein that the same may conform to the record of the case in the Patent Office.

Signed and sealed this 25th day of May, A. D. 1937.

[SEAL]

HENRY VAN ARSDALE,
*Acting Commissioner of Patents.*